United States Patent
Frederiksen et al.

(10) Patent No.: US 6,312,650 B1
(45) Date of Patent: *Nov. 6, 2001

(54) SILENCER

(75) Inventors: Svend Frederiksen, Copenhagen; Lars Frederiksen, Gentofte; Carl Peter Sehested, Horsholm, all of (DK)

(73) Assignee: Silentor Holding A/S, Hedehusene (DK)

(*) Notice: Subject to any disclaimer, the term of this patent is extended or adjusted under 35 U.S.C. 154(b) by 0 days.

This patent is subject to a terminal disclaimer.

(21) Appl. No.: 09/180,770

(22) PCT Filed: May 15, 1997

(86) PCT No.: PCT/DK97/00227

§ 371 Date: Feb. 16, 1999

§ 102(e) Date: Feb. 16, 1999

(87) PCT Pub. No.: WO97/43528

PCT Pub. Date: Nov. 20, 1997

(30) Foreign Application Priority Data

May 15, 1996 (DK) .................................................. 0579/96

(51) Int. Cl.[7] ............................... F01N 3/28; F01N 3/20; F01N 1/24; F01N 1/08
(52) U.S. Cl. ......................... 422/180; 422/171; 422/177; 422/179; 422/181; 181/264; 181/265
(58) Field of Search ..................................... 422/171, 177, 422/179, 180, 176, 172; 60/299; 181/264, 265

(56) References Cited

U.S. PATENT DOCUMENTS

| | | | |
|---|---|---|---|
| 3,852,042 | 12/1974 | Wagner | 422/176 |
| 3,899,303 | 8/1975 | Gaysert | 422/176 |

(List continued on next page.)

FOREIGN PATENT DOCUMENTS

| | | |
|---|---|---|
| 3039742A1 | 5/1982 | (DE) . |
| 0158625A1 | 10/1985 | (EP) . |
| 0556846A1 | 8/1993 | (EP) . |
| 617199 | * 9/1994 | (EP) . |
| 744536 | 11/1996 | (EP) . |
| 4072414A | 6/1992 | (JP) . |
| 05237397 | 9/1993 | (JP) . |
| WO94/10430 | 5/1994 | (WO) . |

* cited by examiner

*Primary Examiner*—Hien Tran
(74) *Attorney, Agent, or Firm*—Birch, Stewart, Kolasch & Birch, LLP

(57) ABSTRACT

A silencer, for silencing and purification of exhaust gases, comprises an air-tight casing (1) connected to an exhaust inlet pipe (2) and to an exhaust outlet pipe (3) and contains at least two acoustic compartments (4*i*, 4*ii*) and one or more monolithic bodies (5) such as catalysers or particle filters through which exhaust gases flow in a flow direction in longitudinal channels or porosities, and one or more pipes or channels (6, 7), at least one pipe or channel penetrating one or more of the monolithic bodies (5) and guiding exhaust gases in a flow direction which is opposite to the flow direction in the channels or porosities of the monolithic body (5), and at least one of the pipes or channels (6, 7) connecting the at least two acoustic compartments (4*i*, 4*ii*). The general flow direction is preferably reversed substantially immediately upstream of a penetrated monolithic body (5) and substantially immediately downstream of either the same monolithic body (5) or of another penetrated monolithic body. Solid particles active for catalytic reduction of NOx, or a spray of a liquid containing an aqueous solution of urea and/or ammonia, active for catalytic reduction of NOx, may be injected into the exhaust gases to impinge on a catalytic layer (35, 36) applied on a baffle (13), an end cap (11, 12) or a flow element being arranged so that said particles and/or droplets impinge thereon.

20 Claims, 4 Drawing Sheets

| | | |
|---|---|---|
| 4,094,645 | 6/1978 | Bailey .................................. 422/180 |
| 4,209,493 | 6/1980 | Olson .................................. 422/176 |
| 4,601,168 | 7/1986 | Harris .................................. 422/176 |
| 4,848,513 | 7/1989 | Csaszar ............................... 181/265 |
| 5,016,438 | 5/1991 | Harris .................................. 422/177 |
| 5,043,147 | 8/1991 | Knight ................................ 422/180 |
| 5,184,464 | 2/1993 | Harris .................................. 422/173 |
| 5,220,789 | 6/1993 | Riley et al. ......................... 422/176 |
| 5,355,973 | 10/1994 | Wagner et al. ..................... 60/299 |
| 5,403,557 | 4/1995 | Harris .................................. 422/169 |
| 5,408,828 | 4/1995 | Kreucher et al. .................... 422/176 |
| 5,426,269 | 6/1995 | Wagner et al. ..................... 181/232 |
| 5,484,575 | 1/1996 | Steenackers ........................ 422/176 |
| 5,758,497 * | 6/1998 | Frederiksen et al. ................ 422/176 |
| 5,833,932 * | 11/1998 | Schmelz .............................. 422/180 |

OTHER PUBLICATIONS

SILENCER

This application is the national phase under 35 U.S.C. §371 of prior PCT International Application No. PCT/DK97/00227 which has an International filing date of May 15, 1997 which designated the United States of America, the entire contents of which are hereby incorporated by reference.

The present invention relates to an apparatus for silencing and purification of exhaust gases, e.g. exhaust gases from internal combustion engines.

In modern vehicles, both silencers and purification devices, e.g. catalytic converters, are in many instances installed in engine exhaust systems with the aim of simultaneously reducing exhaust noise and noxious exhaust gas element emissions to acceptable levels. Under-vehicle space available for such equipment is often limited. In addition, exhaust system back-pressure should not exceed certain limits, to prevent excessive detraction from fuel economy and engine performance. Thus, the combined requirements for effective noise suppression and purification represent geometric difficulties to the exhaust system designer.

Sometimes the space available for silencers and purification devices may also be limited in the case of stationary engines, e.g. gas engines for combined heat and power generation.

Various devices have been introduced to accommodate catalytic converters in silencer casings, instead of using separate units. In most cases such combinations have presupposed a simple series connection of silencing and catalytic elements. Such an arrangement can be designed without excessive space demands, when catalysers occupy only a small fraction of the volume needed for silencers. So far, when legal limits on noxious emissions have compromised with limits to investment costs and to the technology available, catalytic bodies in many cases have been rather small, typically occupying no more than 10–20% of the silencer volume.

However, ever more stringent demands on noxious emissions tend to call for bigger purification devices in addition to engine developments towards lower cylinder emissions, thus aggravating the space requirement conflict. A particularly difficult case is emerging in relation to diesel engine emissions. In the case of gasoline engine, 3-way catalysers are state of the art and provide an effective simultaneous reduction of hydrocarbons, carbon oxide, and nitric oxides. Diesel engines, in contrast, because of high contents of oxygen and particles in the exhaust gases may require a combination of an oxidizing catalytic body, a reducing catalytic body, and a particle trap for effective reduction of all noxious components.

Another problem is that although purification devices like catalytic converters may provide some reduction of high-frequent noise, primarily due to increased flow resistance in the narrow flow channels through the monolith, converters in themselves do not in general contribute significantly to the suppression of low-frequent noise. This is unfortunate, since low-frequent noise suppression in silencers calls for big acoustic chamber volumes to become effective.

U.S. Pat. No. 5,426,269 discloses a silencer with a built-in catalytic converter.

The present invention provides a combined silencer-purification apparatus. The apparatus may be designed in a number of embodiments derived from a common principle, all very efficient, both as silencers and as purification devices. The invention allows for rather voluminous catalysers and particulate traps to be fitted in to silencer casings of a limited size, along with efficient low- and high-frequent noise suppression.

Accordingly, the invention relates to an apparatus for silencing and purification of exhaust gases comprising: an air-tight casing connected to an exhaust inlet pipe and to an exhaust outlet pipe and containing: at least two acoustic compartments, and one or more monolithic bodies through which exhaust gases, in operation of the apparatus, flow in a flow direction in longitudinal channels or porosities, and one or more pipes or channels, at least one pipe or channel penetrating one or more of the monolithic bodies and guiding exhaust gases in a flow direction which is opposite to the flow direction in the channels or porosities of the monolithic body, and at least one of the pipes or channels connecting the at least two compartments.

In the present context, the term "acoustic compartment" designates a continuous space or volume of a cross sectional area throughflowable by gas, the space being limited at a gas inlet part thereof by an inlet of a smaller cross sectional area and at a gas outlet part thereof by an outlet of smaller cross sectional area. The cross sectional area of the space is at least 1.5 times the cross sectional area of the inlet or outlet, normally at least 2 times and in most cases at least 3 times, such as at least 4 times or 5 times or often preferably at least 6, 7, 8 or 9 times the cross sectional area of the inlet or outlet; typical values are 10–20 times the cross sectional area of the inlet or outlet. In the calculation of the throughflowable cross sectional area of the continuous space, any non-throughflowable obstruction is deducted. Thus, for example, when a major part of the cross sectional area of the continuous space is occupied a wall-flow particle filter with wall cross sections occupying up to, e.g., 50% of the cross section of the filter, that 50% of the cross section is deducted.

Typical values of the diameters of the inlet and outlet pipes are 2–11 inches for vehicle applications of an apparatus according to the invention and 300 mm–1000 mm for ship applications. The casing typically has an overall length of 1–3 m for vehicle applications and up to 15 m for ship applications. However, smaller or larger devices may be preferred for some applications.

In the present context, the term "monolithic body" or "monolith" designates, as is customary in the art, a body of an overall or macroscopic monolithic appearance, often a cylindrical body, which has a structure allowing an overall axial gas flow through the body. The term "monolithic" does not rule out that the body could be made from a plurality of segments joined or arranged together. The structure allowing an overall axial gas flow through the body will depend on the construction and material of the monolith; two typical relevant monolith types are:

- a monolith made from a corrugated foil wound up cylindrically so that the corrugations provide axial gas flow channels, and
- a monolith made of a particulate ceramic material, e.g., silicon carbide particles sintered together, and having a honeycomb structure comprising axial channels constituted by a plurality of coextending throughgoing passages separated by common passage walls, the passages being closed at the inlet and the outlet end, alternately, Thus, in a filter body of this kind, the gas travels into the passages open at the inlet side, through the walls into the passages open at the outlet side and then out of the filter body.

The invention is based on findings that one or more flow reversals can be accommodated internally in the silencer/monolith combination in such a way that internal connecting pipes or channels can be designed to a substantial length, compared to the total length of the casing containing all sound suppression and emission reducing elements; the length of the internal connecting pipes or channels will normally be at least the length of a monolith or almost the length of a monolith and can be up to, e.g, almost the length of the casing or even longer. The invention makes it possible to provide designs with rather narrow flow areas of internal pipes or channels, such as flow areas of about the same size as the inlet and outlet pipes or even smaller, without causing excessive pressure drops, typical pressure drops being of the magnitude of 1–2 times the dynamic pressure in the inlet pipe when the monolith or monoliths is/are of the through-flow catalyst monolith type. In accordance with this last objective, it is preferable to use smooth surfaces of these internal pipes or channels, preferably without any perforations in their side walls.

The acoustic attractiveness of the above mentioned findings and objectives can be explained by the theory of silencers in which sound is reflected at changes in flow area between pipes and acoustic chambers. Such silencers act as low-pass filters, i.e. they are effective above a certain natural frequency. In the case of a single acoustic chamber of volume V, connected to a tailpipe of length L and cross-sectional area a, this natural frequency can be expressed as (c=velocity of sound):

$$f = \frac{c}{2\pi} \sqrt{\frac{a}{LV}} \quad (1)$$

In the case of two chambers of volumes V1 and V2, connected by a pipe of length L and of cross-sectional area a, the natural frequency can instead be expressed as:

$$f = \frac{c}{2\pi} \sqrt{\frac{a}{L}} \sqrt{\left(\frac{1}{V1} + \frac{1}{V2}\right)} \quad (2)$$

Above a certain, sufficiently high frequency, silencer sound level attenuation increases with the number of chambers. For a given total silencer volume, however, and given lengths of internal pipes, an increased number of acoustic chambers raises the lower limiting frequencies of the low-pass filters, so that the number acoustic chambers will be limited. In many cases of vehicle silencers, no more than two chambers can realistically be fitted into a given silencer volume.

When applying eqs. (1) and (2) to an apparatus having one or more acoustic compartments containing a monolithic body, the total void volume constituted by channels and open pores of the monolithic body should be included in the volumes V, V1 and V2, respectively.

Thus, big pipe lengths L and small cross-sectional areas a are necessary. An additional incentive to use small cross-sectional areas a is derived from the fact that the bigger the ratio:

$$r = A/a \quad (3)$$

between acoustic chamber flow area A and pipe cross-sectional flow area a is, the larger sound reflection is achieved at the changes in cross-sectional area between acoustic chambers and pipes.

The invention combines penetration of one or more monolithic bodies with one or more flow reversals inside the silencer, to make possible usage of comparatively long, narrow and thus acoustically favorable internal pipes or channels.

In most cases purification elements, such as e.g. catalytic monoliths, are made as full, cylindrical bodies in the prior art. When hollow bodies have been employed, it is has been for varying reasons differing from the purpose of the present invention.

Thus, for example, German Offenlegungsschrift DE 3713964 A1 discloses a catalytic device in which one or more monolithic bodies are penetrated by an inlet pipe or by an outlet pipe connecting the casing with the external exhaust piping system of an engine. In this device the primary purpose is to achieve an optimally high operating temperature of the catalyser. A secondary purpose is to achieve an effectively long inlet pipe from the engine, even if the device is placed rather close to the engine, to optimise flow-dynamic conditions in the connecting inlet pipe, i.e. to promote engine cylinder scavenging.

Flow reversals have been commonly used in silencers and to some extent also in combined silencer/catalyser arrangements, as e.g. described in U.S. Pat. No. 5,043,147. Here, however, catalyst bodies are not penetrated by reversed-flow pipes or channels.

Although arranging a penetrating pipe in a monolith according to the principles of present invention represents a deviation from most common practices, such a penetration is not very difficult to achieve in manufacture. As an example, in monolithic bodies manufactured from corrugated foils, penetrating acoustic flow pipes or channels can be accommodated as follows: A cylindrical hollow structure can be made by wrapping the foil onto a central pipe to create a spirally arranged pattern of longitudinal, parallel channels external to the central pipe. To protect the monolith from thermal expansion and from vibrations emanating from exhaust gas flow led centrally through the structure, when inserting the catalyser into a silencing unit, the central pipe can be made flexible, e.g. with corrugated walls, and can be arranged around a somewhat smaller rigid pipe guiding the exhaust flow. The separating, annular space can be filled with a flexible, heat-resistant material such as the material Interam® available from 3M, St. Paul, Minn. U.S.A. In case the penetrating exhaust pipe is arranged as an extension of the inlet pipe to the silencer, a flexible connection may be inserted between the two pipes, to provide additional protection to the monolith from vibrative mechanical excitation.

However, in the device according to the invention, the monolith or monoliths may be of many different kinds according to per se well-known technologies which may be used alternatively or in combination, as will be obvious to the engineer once he has understood the present invention.

Thus, the monolith may be of the throughflow or wall-flow type, the latter forcing the exhaust gases to take tortuous paths, to achieve a mechanical filtering effect in a particulate trap. The internal surfaces of the monolith may be covered by catalytical layers to promote various steps in purification conversion processes. The walls of the monolith may be ceramic, metallic or glass-fibrous. The monolith can be of a foam or a wire mesh structure. The monolith can be arranged as an assembly of segments, e.g. separated by division planes that are radial or perpendicular to the general flow direction. The latter arrangement will typically be adopted when different types of purification elements are arranged adjacent to each other in series flow configurations.

When selective catalytic reduction of NOx is accommodated in a silencer/purification device according to the invention, flow reversals and other abrupt flow deflections can be utilised for improving decomposition of elements, such as urea, injected into the exhaust gas flow upstream of the catalytic body. This can be done by coating internal surfaces preferably adjacent to flow reversals with a catalytic layer which is active in decomposing droplets impinging on the surfaces. As will be explained, this facility is a further element of the invention which is particularly attractive in the case of narrow under-vehicle space limitations imposed on diesel engine exhaust systems of e.g. trucks and buses.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above objects and features of the invention will become more apparent from the following detailed description by reference to the drawings, in which.

In most of these examples, the penetrating pipe is shown to be located centrally to a monolith. Most of the embodiments are shown to be of circular-symmetric design, but obviously other types of cross-sections, such as elliptical, conical configurations etc. are possible and may be suitable in various circumstances.

Figure 1:
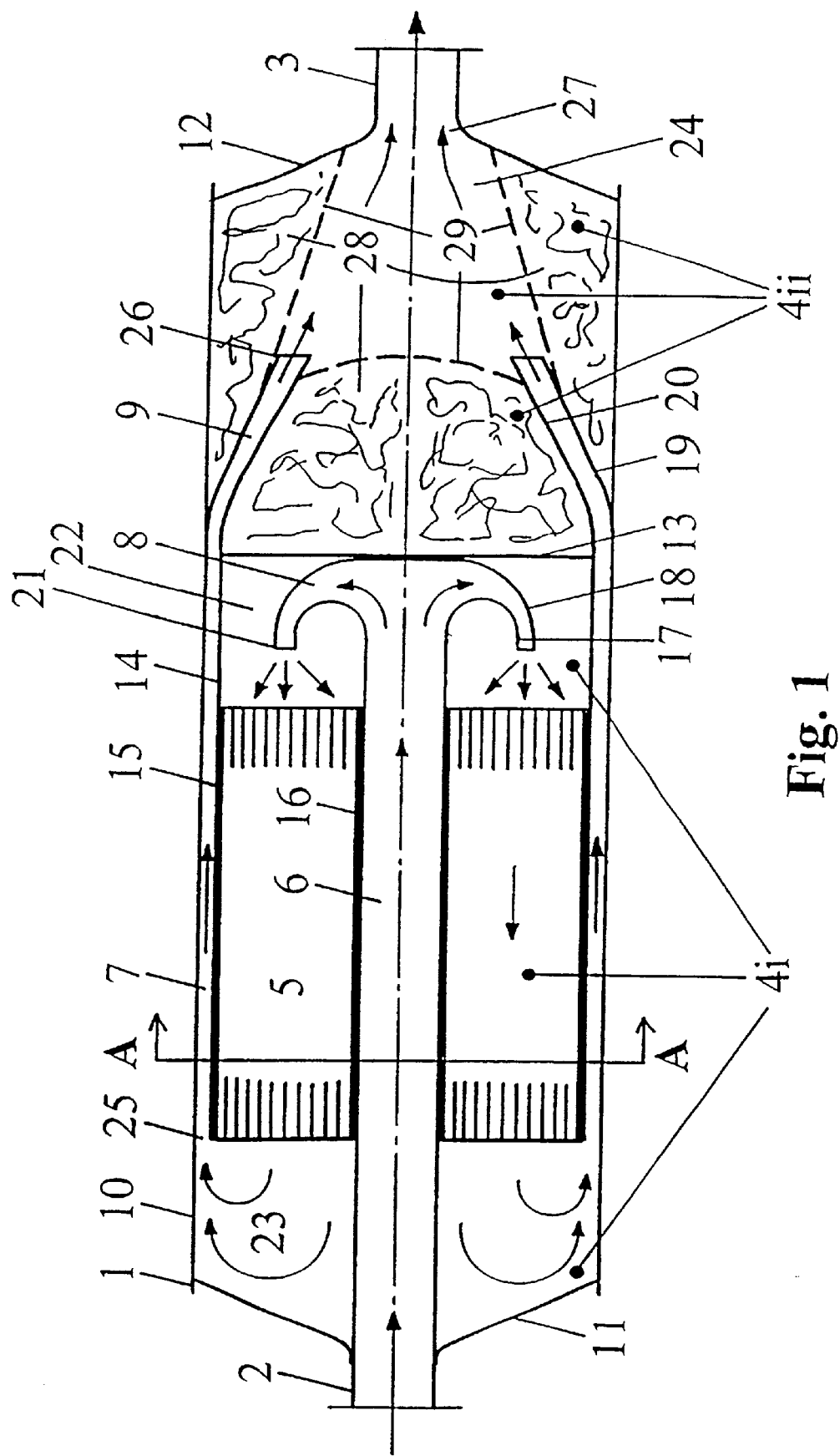
FIG. 1 shows a first embodiment of the invention.

In FIG. 1, a central pipe 6 is shown to penetrate a monolith 5. A further, annular channel 7 is shown to be arranged around the circular periphery of the monolith. The pipe 6 is connected directly to the inlet pipe 2 which leads unsilenced and uncleaned exhaust gases into the silencer/purification unit at one end of the casing 1. An outlet pipe 3 leads silenced and cleaned gases from the other end of the casing. The casing is made up of a cylindrical shell 10 and of end caps 11 and 12.

An internal baffle 13 divides the space within the casing into 2 aggregate acoustic compartments, 4*i* and 4*ii*. These compartments are each made up of various cavities: The left compartment, 4i, is made up of the two cavities, 22, 23 immediately upstream and downstream, respectively, of the monolith, and of the aggregate cavity made up of the space within the multitude of longitudinal channels within the monolith. The compartment to the right, 4*ii*, is made of a central cavity 24 and of cavities within sound absorptive material (mineral or glass wool) 28, arranged protected from the exhaust gag flow by perforated baffles 29.

The logic behind linking the mentioned six cavities together into two groups under common reference numerals: 4*i* and 4*ii*, respectively, is that this makes the acoustic function of connection channel 7 more clear. It should be pointed out that, provided the sound absorptive material is made appropriately, that is neither too mechanically weak or too acoustically massive, the gas volumes within the absorptive material will act as effective extensions to volume or central cavity 24, thus lowering the natural frequency according to equation (2). Monolith 5 will cause some acoustic subdivision of compartment 4i, the more so the smaller is the porosity of the monolith.

Two types of diffusers 8 and 9 have been fitted onto the penetrating pipe 6 and onto the annular channel 7, respectively. These diffusers serve several functions: First, the flow areas in both diffusers widen in the flow direction, whereby dynamic pressure is recovered which contributes to a comparatively low pressure drop across the silencer/purification unit. Second, in accordance with European patent no. EP 0 683 849, the narrow, predominantly axial outflows from the diffusers have been positioned at the pressure nodes for transverse resonant gas vibrations in the cylindrical cavities into which the flows are guided by the diffusers, thus suppressing such resonances. Finally, the diffuser 8 serves to reverse the general flow direction and to distribute the flow to the inlet of the monolith more evenly, thereby increasing the efficiency of the conversion and preventing uneven loading of the various, parallel channels of the monolith. The left diffuser, 8, is made up of two dome-shaped baffles 17 and 18, whereas the annular diffuser 9 is made up of two conical pipes 19 and 20 which diverge somewhat to create a flow area increase, and which both are directed inwardly to guide the flow from the annular channel 7 towards the centrally positioned outlet pipe 3.

The annular channel 7 is made up of part of the outer, cylindrical shell 10 and of an inner, likewise cylindrical shell 14. This inner shell also serves the purpose of contributing to fix the monolith 5 which is inserted into the shell 14, wish an interposed, flexible and heat-resistant layer 15. The monolith is protected from thermal expansion and from vibrations from the penetrating pipe 6 by a further, flexible and heat-resistant layer 16.

Figure 2:
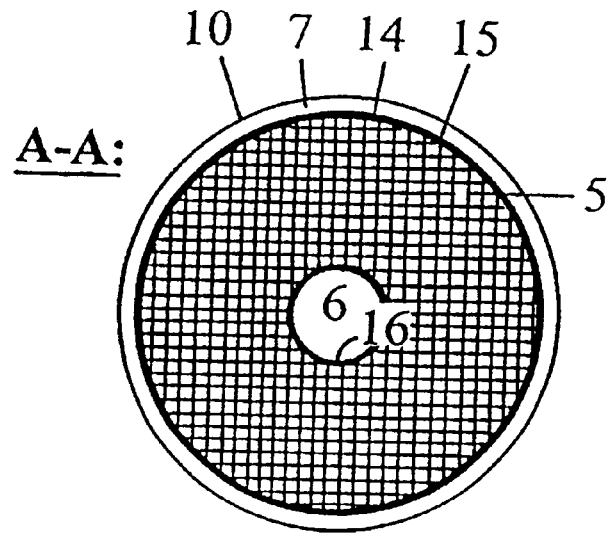
FIG. 2 shows a cross-section A—A of the embodiment of FIG. 1.

FIG. 2 shows a cross-section A—A of the embodiment of FIG. 1.

Exhaust gases entering the silencer/converter through the inlet pipe 2 are led further through the catalytic monolith 5 by the centrally positioned pipe 6 to the diffuser 8 which recovers part of the rather high dynamic pressure in the pipe 6. In the diffuser, the general flow direction is reversed, and the exhaust gas flow is led to the cavity 22 through the diffuser outlet 21. Here, an abrupt increase of flow area takes place which contributes to sound reflection and thus to the overall sound attenuation in the silencer/purification unit.

Outlet 21 is positioned at some distance from the face of the monolith and at an intermediate radius between the inner and outer radii of the monolith. Thus, exhaust gases are distributed rather evenly to the multitude of longitudinal channels of the monolith. In these channels the flow direction is opposite to the direction of flow in the penetrating pipe 6. From the outlet face of the monolith the exhaust gases enter the cavity 23, where the general flow direction is reversed once again, and the exhaust gases are led radially outwardly towards the inner surface of the cylindrical shell 10.

The exhaust flow leaves the cavity 23 by entering the inlet 25 to the annular channel 7. Here, an abrupt decrease of flow area takes place which contributes to sound reflection. At the inlet 25 the inner shell 14 has been slightly deformed (or alternatively has been extended by a small ring) to provide a small curvature which prevents flow separation and thus reduces entrance pressure losses to a minimum. Thereby the flow area of the channel 7 can be kept as small as possible which is favorable to sound attenuation. The annular channel extends to the annular diffuser 9, in which a second pressure recovery takes place, this time a partial recovery of the rather high dynamic pressure in the annular channel 7.

At the diffuser outlet 26 the exhaust gases are directed into the cavity 24, from which they enter the outlet pipe 3 at the aperture 27 of the end cap 12. At the diffuser outlet 26 an abrupt increase in flow area takes place which contributes to sound reflection. At the aperture a curvature has been provided for, to prevent flow separation and thereby keep entrance pressure losses at a minimum. In spite of this curvature, the flow area transition from the cavity 24 to the outlet pipe 3 acoustically acts as an abrupt decrease of flow area which contributes to sound reflection. Additional sound attenuation, in particular at higher frequencies, is provided for by the sound absorptive material 28 which by means of perforated baffles 29 is held positioned in the casing and is protected from fluid dynamic forces.

From inlet pipe 2 to diffuser outlet 21 exhaust gases are led centrally inside the casing 1. Thereby the loss of exhaust gas temperature from the inlet pipe to the monolith will be only minimal. When the monolith is a catalyser, this helps keep a high degree of catalytic conversion, in particular in load situations when the gas temperature is generally low. Of course, further protection from heat losses can be provided for by adding heat insulation around the casing 1. Such insulation can also be adopted with the aim of reducing sound break-out through the shell 1 and through the end caps 11 and 12.

It can be seen that the double flow reversal which takes place in the apparatus has provided a basis for designing the unit with a rather long and narrow channel 7 which connects two acoustic compartments, 4i and 4ii. Even though the monolith occupies as much as around ⅓ of the total unit volume, the connecting channel 7 is as long as ⅔ of the total length of the unit. This means that the 2 chambers and their connecting channel together constitute a very low natural frequency f (according to the previously given equation (2)). Thus, it has been made possible to accommodate, within a limited total volume of the silencer/purification unit, two acoustic compartments and four sound reflecting flow area transitions, namely diffuser outlet 21, inlet or entrances 25, diffuser outlet 26 and aperture 27. By virtue of the rather long channel 7, all the three first-mentioned flow area transitions will be acoustically effective from a rather low frequency, somewhat above the natural frequency f. Provided the length of the outlet pipe, together with its possible extension to the outlet to the atmosphere, is not too short, also the last-mentioned flow area transition, 27, will be acoustically active from a rather low frequency.

The flow area of the connecting channel 7 is kept rather narrow which increases the degree of sound reflection according to equation (3). In spite of the narrow channel, and even though 2 flow reversals take place inside the device, the overall pressure drop across the unit can be kept comparatively low.

Figure 4:
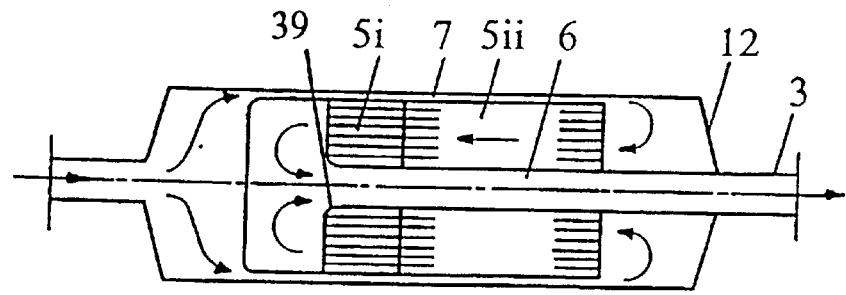
FIG. 4 shows a third embodiment of the invention.

In the embodiment of FIG. 4, a curvature 39, preventing flow separation, has been applied to the inner contour of the annular inlet to connecting channel 7, as well as to the circular inlet contour of the extension of the outlet pipe 3 into the apparatus in order to reduce the overall pressure drop across the unit. Curvatures of similar function can be seen in FIGS. 8, 9, 10 and 11.

Figure 8:
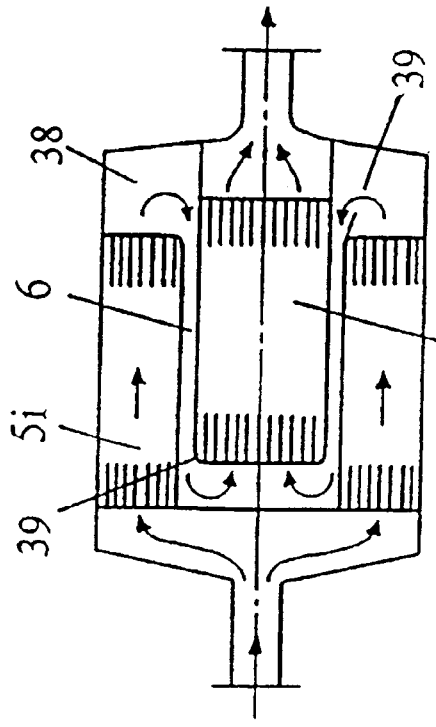
FIG. 8 shows a sixth embodiment of the invention.

In FIG. 8, a curvature 39 has been applied to the outlet of the extension of the inlet pipe 2 into the apparatus. A similar curvature can be seen in FIG. 9. In other cases, e.g., in FIG. 4, a sharp-edged outlet has been used instead. In general, curvatures are preferred on outlets which are positioned close to a wall on which the flow impinges, since in such cases the curvature can have a substantial effect in eliminating or minimising flow separation. When flows extend from a pipe or channel without impingement on an Opposite wall, a curvature applied to an outlet contour may be even harmful, due to flow instability characterised in transverse flow jet pulsation. The question when to apply, and When not to apply curvatures 39, can be settled by experiment or by computer simulation, using commercially available computer codes.

Figure 3:
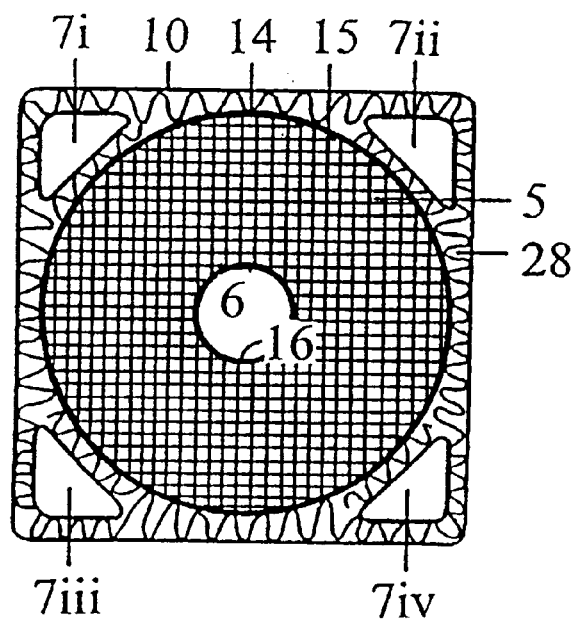
FIG. 3 is an alternative to the cross-sectional view A—A of FIG. 2, indicating a slightly modified version of the first embodiment of the invention.

In FIG. 3, the annular channel 7 of FIG. 2 has been divided into 4 triangular channels 7i, ii, iii, and iv which divide the flow into 4 equal, parallel flows. The cylindrical outer shell 10 of FIG. 2 has been replaced by a shell of squared profile. Heat-insulating material, 28 (e.g. mineral wool of the type also used as sound-absorptive material), has been inserted into the spacing between the outer and inner shells, as well as between the outer shell and the four triangular channels.

Shells with plane surfaces tend to be less effective in insulating against sound break-out, compared to curved shells. Thus, it can be advisable to extend the inner, cylindrical shell, 14, to the far left end of the unit, i.e. from the entrances or inlet 25 to the parallel channels and back to the inside of the left end cap 11, combined with a provision for entrance slots in the extended part of the inner shell, to allow for inflows to the four channels 7i–iv from the far-left cavity 23.

The alternative cross-sectional geometry of FIG. 3 in some instances will provide functional advantages over the first embodiment of the invention at the sacrifice of a slightly more complicated design. The squared outer shell may be particularly appropriate when the available space for the device is in itself squared, as is sometimes the case. In such instances, the squared shell form represents a maximum utilisation of the cross-section for the various functions to be fulfilled by the unit. It can be seen that for a given height and width of the unit, a bigger diameter of the catalytic monolith can be selected in FIG. 3, compared to FIG. 2. This helps keep down the pressure drop across the monolith. Another feature of the alternative embodiment is that the surface area/cross-sectional area is smaller in the case of the 4 parallel channels, compared to an annular channel, For a given pressure drop across the connecting channel(s) 7, this allows for a smaller total cross-sectional area of the 4 channels which is favorable in terms of the degree of sound reflection according to equation (3).

In a third embodiment of the invention, according to FIG. 4, two monoliths 5i and 5ii have been connected in series. For instance, monolith 5i could be a reducing catalytic converter and monolith 5ii an oxidising converter. In FIG. 4 the flow arrangement differs from that of the first embodiment shown in FIG. 1 in that the monolith penetrating pipe has been connected to the outlet pipe 3 instead of to the inlet pipe 2. This arrangement can be useful, e.g. when the distance between the end cap 12 and the far end of the outlet pipe is rather small. In such a case the length of the pipe 6 adds substantially to the acoustically effective tail length L determining the natural frequency according to equation (1).

Figure 5:
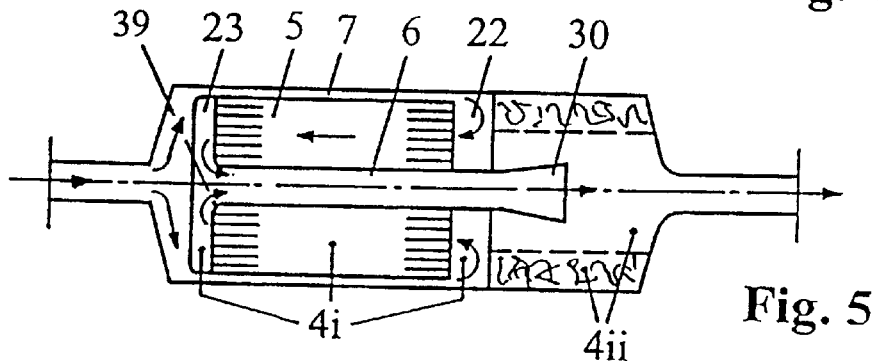
FIG. 5 shows a fourth embodiment of the invention.

FIG. 5 shows a fourth embodiment according to the invention. Here, the monolith penetrating pipe 6, together with a diffuser 30 constitutes the connecting pipe between two acoustic compartments 4i and 4ii. This usage of a central, penetrating pipe as the interconnecting pipe is in itself very favorable in terms of pressure loss vs. natural frequency f according to eq. (2), as well as cross-sectional ratio r according to eq. (3). The reason is that a simple circular cross-section represents the lowest possible surface area/cross-sectional area ratio. Thus, for a given pressure drop across the connecting pipe, the flow area then becomes a minimum.

In FIG. 5, the cavities 22 and 23 are rather small, so that the major part of the acoustically effective volume of the compartment 4i is made up of the aggregate volume of the porosity of the monolith 5. Thus, FIG. 5 represents a particularly compact embodiment of the invention.

Figure 6:
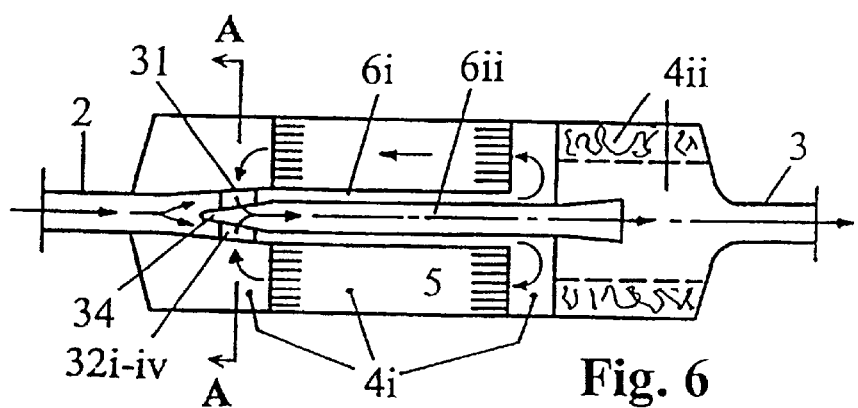
FIG. 6 shows a fifth embodiment of the invention.
Figure 7:
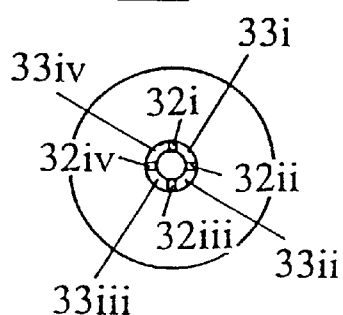
FIG. 7 shows a cross-section A—A of the embodiment of FIG. 6.

FIGS. 6 and 7 show a fifth embodiment of the invention, utilising the principle of surface area/cross-sectional area minimization of pipes/channels to the most. Here, an annular channel 6i, penetrating a monolith 5 has been arranged around a central pipe 6ii of circular cross-section. The outer, annular channel 6i constitutes a continuation of the inlet pipe 2, and the central pipe 6ii connects 2 internal acoustic compartments 4i and 4ii. A special flow element 31 serves as a low friction-loss guide for the two exhaust gas flows, i.e. guiding flow from the inlet pipe 2 to the annular channel 6i, and the reversing flow leaving the left and outlet face of the monolith 5 to the central pipe 6ii. In the flow element 31 the two flows cross each other. The flow to the central pipe is guided radially inwardly through a number of radial slots 32i–iv. The inlet flow to the annular space is guided past these slots in 4 passages 33i–iv and is simultaneously being forced slightly outwardly by the central, conical and hollow body 34.

FIG. 8 shows a sixth embodiment of the invention, in which 2 monoliths have been arranged inside a particularly long, annular connecting channel 7. Penetrating pipe 6i has been connected to the inlet pipe 2, and penetrating pipe 6ii has been connected to the outlet pipe 3.

Figure 9:
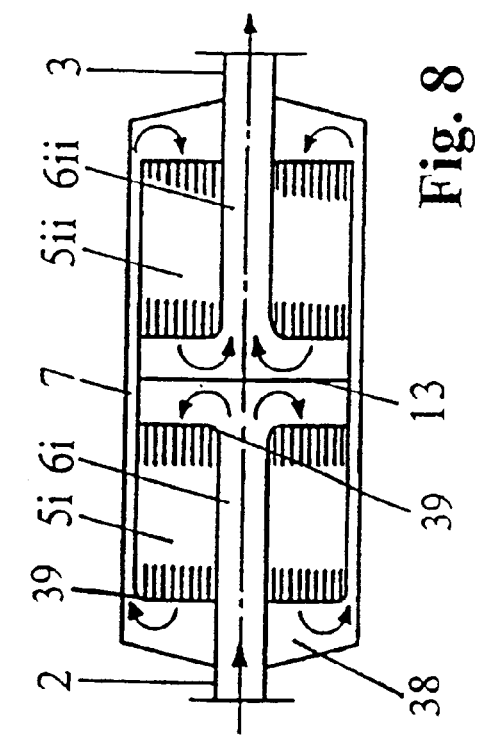
FIG. 9 shows a seventh embodiment of the invention.

FIG. 9 shows a seventh embodiment of the invention, in which an annular channel 6 has been arranged between 2 monoliths and thus provides a penetration through the entire monolith assembly.

Figure 10:
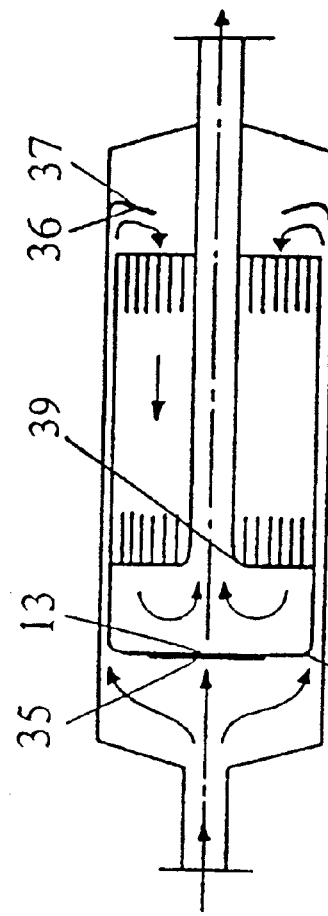
FIG. 10 shows a eighth embodiment of the invention.

FIG. 10 shows an eighth embodiment of the invention, in which a monolith 5ii has been arranged inside another monolith 5i (as in FIG. 9), and in which a penetrating pipe 6 has been arranged centrally inside the inner monolith 5ii.

The monoliths shown in FIGS. 1–10, and quite generally the monoliths of the apparatus of the present invention, may consist of up to three types of purification elements, placed one after the other, in the general flow direction of the exhaust gas, each monolith performing one of the following purification processes: (A) Selective Catalytic Reduction (SCR) by ammonia of NOx in the gas, (B) catalytic oxidation of hydrocarbons and CO in the gas, and (C) removal of soot particles in the gas by filtration in the gas through the porous walls of a monolithic block in which every second channel is plugged at opposite ends of the channels in the block. The order will typically be that process (A) comes first, while (C) may follow (B), or (B) may follow (C).

The ammonia required for process (A) is, usually, formed by catalytic decomposition of urea, or other nitrogen containing chemicals that are injected in the form of droplets of aqueous solution or a dry powder of the chemical that is sprayed into the gas stream upstream the monolith that catalyses process (A). The decomposition of the chemical into ammonia and other gaseous products requires a long residence time of the liquid or solid particles in the gas stream, if the decomposition must take place with the particles staying in the gas stream, because the rate of heat transfer through the gas film surrounding the particles is low. If, however, the particles are caused to impinge on a solid surface of a material that catalyses the decomposition of the chemical, the rate of decomposition would be increased, firstly because the rate of heat transfer between the gas stream and a stagnant surface is much higher, and secondly due to the catalytic effect of the surface. When, furthermore, the catalytic surface is porous and particles are liquid, or they melt on the surface, the rate of decomposition will be further increased.

Figure 11:
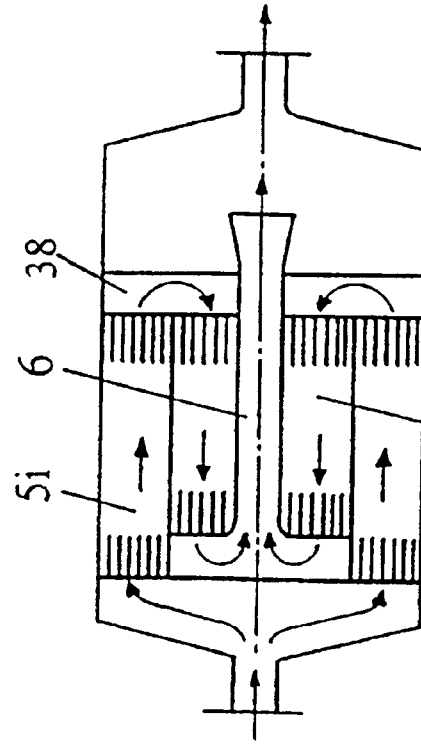
FIG. 11 shows a ninth embodiment of the invention.

In the present invention it has been found that particles in the gas stream preferably impinge on surfaces of the gas conduit at which the gas stream is deflected which may e.g. be wall or baffle 18 in FIG. 1 or internal baffle 13 in FIG. 8. FIG. 11 shows a ninth embodiment of the invention, in which catalytic layers 35 and 36 have been added to two walls on which particles may impinge, viz. part of internal baffle 13 and a flow element 37. The layers are typically porous and have a thickness between 0.1 and 1 mm.

The catalytic material is typically oxides of Al, Si, V, Ti, Zr or Fe, or mixtures hereof.

The amount of reducing agent injected is preferably equivalent to the total amount of NOx in the exhaust gas. Hence, with urea ag the agent, one mole of urea is injected per two moles of NOx.

In preferred embodiments of this aspect of the invention, nitrogen-containing liquids such as aqueous solutions of urea or ammonia are sprayed into the gas stream by means of a two-phase nozzle using pressurized air at, e.g., 2–3 bar with the nozzle placed in the middle of the gas stream. Full cone nozzle types with spray angles in the range 20–45° are preferred. Such nozzles are commercially available. Suitable nozzles may be found in the catalogue "Die ganze Welt der Dusentechnik" p. 1.16 through 1.21. edition 921, from the company Lechler in Germany. With urea of high concentrations of about 50%, the nozzle type No. 158 for viscous liquids is suitable. A minimum flow of air through the nozzle safeguards against heating the nozzle above 120°. Higher temperatures of the nozzle could concentrate or decompose the urea in the nozzle thereby plugging the nozzle.

A solid powder can be injected by passing it through a funnel placed above and close to the exhaust gas conduit, the tip of the funnel extending into the gas conduit and the powder being blown into the gas stream by pressurized air injected at the tip of the funnel in analogy to known principles for unloading fine powders from silos.

When the process step (A) comes before the process steps (B) and (C), the nozzle for injection of the reducing agent is preferably placed in the inlet pipe 2, or in a duct upstream of the inlet pipe 2, in FIG. 2, and in a similar position at the inlet or upstream of the inlet to the silencer in FIGS. 4, 5, 6, 8, 9, 10 and 11.

When the process step (A) comes after one of the other process steps, the nozzle is preferably placed in the gas stream downstream of the preceding process step. FIGS. 8, 9 and 10 show embodiments of the invention in which process step (A) could be performed in the second of the two separate catalyst steps; here, the reducing agent could be injected in 2–4 nozzles placed at the positions 38 close to the outlet of the preceding, annular catalyst block.

A layer of porous catalytic material can be coated on steel surfaces according to methods known from the manufacture of Catalyzed Hardware. The principles are as follows: The steel surface is sandblown, painted with a high temperature paint, preferably on basis of Ti or Zr compounds, and heated to 300–500° C. before applying an alumina-based wash coat of the same type as used for wash-coating catalytic monoliths.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Alternatively, the steel surface could be plasma-sprayed with oxide of, e.g., V, Al, Fe, Zr or Si forming a layer that could be used itself as catalyzed layer, or it could be used as primer for further wash-coating according to known methods.

What is claimed is:

1. An apparatus for silencing and purification of exhaust gases, comprising: an air-tight casing connected to an exhaust inlet pipe and to an exhaust outlet pipe and containing: at least two acoustic compartments, and one or more monolithic bodies defining an outer surface and having longitudinal passages through which exhaust gases flow in a flow direction, and one or more pipes or channels, at least one pipe or channel penetrating one or more of the monolithic bodies and guiding exhaust gases in a flow direction which is opposite to the flow direction in said longitudinal passages of the monolithic body, at least one of the pipes or channels connecting the at least two acoustic compartments, wherein said at least one pipe or channel connecting the at least two acoustic compartments extends throughout substantially the entire length of said monolithic body, and wherein said at least one pipe or channel penetrates the monolithic body or extends along its outer surface.

2. An apparatus according to claim 1, wherein the monolithic body is arranged in such a way in relation to the casing that the general flow direction is reversed substantially immediately upstream of a penetrated monolithic body and substantially immediately downstream of either the same monolithic body or of another penetrated monolithic body.

3. An apparatus according to claim 1, wherein said one or more pipes or channels comprise a penetrating pipe or channel which penetrates the monolithic body and which is positioned centrally in the cross-section of one or more of the monolithic bodies.

4. The apparatus according to claim 1, wherein said one more pipes or channels comprise a penetrating channel which penetrates the monolithic body and which has an annular cross-section.

5. The apparatus according to claim 1, wherein said one or more pipes or channels comprise a first penetrating pipe or channel which penetrates the monolithic body and which is positioned centrally in the cross-section of one or more of the monolithic bodies, and a second penetrating channel which penetrates the monolithic body and which has an annular cross-section, and wherein the first penetrating channel is immediately surrounded by the second penetrating channel.

6. The apparatus according to claim 1, wherein said one or more monolithic bodies comprise a cylindrical monolithic body, and wherein said one or more pipes or channels comprise an annular channel which surrounds the cylindrical monolithic body.

7. The apparatus according to claim 1, wherein said one or more pipes or channels comprise two or more pipes or channels for guiding parallel exhaust flows, the apparatus comprising a first common pipe or cavity which, at an outlet thereof, diverges into said two or more pipes or channels, said two or more pipes or channels merging at respective outlets thereof, into a second common pipe or cavity.

8. The apparatus according to claim 1, wherein one or more of the monolith penetrating pipes or channels communicate with the inlet pipe, either directly, or via one or more further internal pipes or channels.

9. The apparatus according to claim 1, wherein one or more of the monolith penetrating pipes or channels communicate with the outlet pipe, either directly, or via one or more further internal pipes or channels.

10. The apparatus according to claim 1, wherein said longitudinal passages of the monolithic body define a space, and wherein a major part of one or more of the acoustic compartments is constituted by said space.

11. The apparatus according to claim 1, wherein at least part of a contour of an outlet and/or an inlet of at least one of said pipes or channels is provided with curvatures for preventing flow separation.

12. The apparatus according to claim 11, wherein at least one area of impingement of gas flow is provided inside said casing, and wherein said at least one of said pipes or channels has an outlet which is provided with at least one of said curvatures and which is adjacent to said area of impingement.

13. The apparatus according to claim 1, wherein a diffuser is fitted to an outlet end of one or more of the pipes or channels.

14. The apparatus according to claim 1 wherein surfaces of said longitudinal passages of at least one of said monolithic bodies are catalytically active, so that the surfaces are active in the decomposition of impurities in the exhaust gases.

15. The apparatus according to claim 1, further comprising means for injecting solid particles active for catalytic reduction of NOx, or a spray of a liquid containing components, active for catalytic reduction of NOx, into exhaust gases upstream of the apparatus, into the inlet pipe, or into at least one of said pipes or channels upstream of at least one of said one or more monolithic bodies.

16. The apparatus according to claim 15, wherein said liquid containing components comprises an aqueous solution of urea and/or ammonia.

17. The apparatus according to claim 1, wherein one or more layers are applied to an end cap, to an internal baffle, or to a wall of a flow element inside said casing, said layer containing a material that has a catalytic activity for decomposition into gas phase ammonia of particles or droplets of urea or other nitrogen containing components, said internal baffle, said end cap, or said flow element being arranged so that said particles and/or droplets impinge thereon.

18. The apparatus according to claim 17, wherein said flow element is positioned upstream of a most upstream one of said one or more monolithic bodies.

19. The apparatus according to claim 17, wherein said end caps, said internal baffle, and/or said flow element is/are arranged so that the exhaust gas flow direction reverses approximately 180 degrees adjacent to an area wherein the particles and/or droplets impinge thereon.

20. The apparatus according to claim 17, wherein the one or more layers are porous and comprise oxides of Al, Si, V, Ti, Zr or Fe, or mixtures thereof.

* * * * *